(12) United States Patent
Xu

(10) Patent No.: US 12,315,165 B2
(45) Date of Patent: *May 27, 2025

(54) OBJECT DETECTION METHOD, OBJECT DETECTION DEVICE, TERMINAL DEVICE, AND MEDIUM

(71) Applicant: GUANGDONG OPPO MOBILE TELECOMMUNICATIONS CORP., LTD., Dongguan (CN)

(72) Inventor: Yi Xu, Palo Alto, CA (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 489 days.

This patent is subject to a terminal disclaimer.

(21) Appl. No.: 17/837,165

(22) Filed: Jun. 10, 2022

(65) Prior Publication Data
US 2022/0319146 A1  Oct. 6, 2022

Related U.S. Application Data

(63) Continuation of application No. PCT/CN2020/114063, filed on Sep. 8, 2020.
(Continued)

(51) Int. Cl.
G06T 7/11  (2017.01)
G06T 7/149  (2017.01)
(Continued)

(52) U.S. Cl.
CPC ............ *G06T 7/11* (2017.01); *G06T 7/149* (2017.01); *G06V 10/7635* (2022.01);
(Continued)

(58) Field of Classification Search
CPC . G06T 7/11; G06T 7/149; G06T 2207/10028; G06V 20/20; G06V 20/64; G06V 10/82; G06V 10/7635; G06V 40/16
See application file for complete search history.

(56) References Cited

U.S. PATENT DOCUMENTS 9,807,365 B2   10/2017  Cansizoglu et al.
10,740,920 B1   8/2020  Ebrahimi Afrouzi et al.
(Continued)

FOREIGN PATENT DOCUMENTS

CN   103247041 B   *   8/2013
CN   104899883 A       9/2015
(Continued)

OTHER PUBLICATIONS

International Search Report and Written Opinion dated Dec. 8, 2020 in International Application No. PCT/CN2020/114063. English translation attached.
(Continued)

*Primary Examiner* — Shaghayegh Azima
(74) *Attorney, Agent, or Firm* — Sheppard, Mullin, Richter & Hampton LLP

(57) ABSTRACT

The present disclosure provides an object detection method. The method includes: acquiring a scene image of a scene; acquiring a three-dimensional point cloud corresponding to the scene; segmenting the scene image according to the three-dimensional point cloud corresponding to the scene to generate a plurality of region proposals; and performing object detection on the plurality of region proposals to determine a target object to be detected in the scene image. In addition, The present disclosure also provides an object detection device, a terminal device, and a medium.

18 Claims, 4 Drawing Sheets

Related U.S. Application Data

(60) Provisional application No. 62/947,333, filed on Dec. 12, 2019.

(51) Int. Cl.
  *G06V 10/762* (2022.01)
  *G06V 10/82* (2022.01)
  *G06V 20/20* (2022.01)
  *G06V 20/64* (2022.01)
  *G06V 40/16* (2022.01)

(52) U.S. Cl.
  CPC .............. *G06V 10/82* (2022.01); *G06V 20/20* (2022.01); *G06V 20/64* (2022.01); *G06T 2207/10028* (2013.01); *G06V 40/16* (2022.01)

(56) References Cited

U.S. PATENT DOCUMENTS

| | | | |
|---|---|---|---|
| 2014/0192050 A1* | 7/2014 | Qiu | G06V 20/653 345/420 |
| 2015/0003723 A1* | 1/2015 | Huang | G06V 20/653 382/154 |
| 2017/0243352 A1* | 8/2017 | Kutliroff | G06T 19/006 |
| 2018/0144458 A1* | 5/2018 | Xu | H04N 13/271 |
| 2018/0322623 A1 | 11/2018 | Memo et al. | |
| 2018/0330149 A1* | 11/2018 | Uhlenbrock | G06T 7/11 |
| 2019/0147245 A1* | 5/2019 | Qi | G06V 10/82 382/103 |
| 2020/0048045 A1* | 2/2020 | Xiong | B66B 13/143 |
| 2020/0160487 A1* | 5/2020 | Kanzawa | G06V 20/56 |
| 2020/0376675 A1* | 12/2020 | Bai | G06T 5/94 |
| 2021/0090242 A1* | 3/2021 | Hever | G06T 17/20 |
| 2021/0192793 A1* | 6/2021 | Engelland-Gay | G06T 3/40 |
| 2022/0020215 A1* | 1/2022 | Banerjee | G06T 7/55 |
| 2024/0427144 A1* | 12/2024 | Kern | G02B 27/017 |

FOREIGN PATENT DOCUMENTS

| | | | |
|---|---|---|---|
| CN | 106529573 A | | 3/2017 |
| CN | 107291093 A | | 10/2017 |
| CN | 108491818 A | | 9/2018 |
| CN | 108710818 A | | 10/2018 |
| CN | 109145677 A | | 1/2019 |
| CN | 109345510 A | | 2/2019 |
| CN | 109670517 A | | 4/2019 |
| CN | 109816664 A | | 5/2019 |
| CN | 110110802 A | * | 8/2019 |
| CN | 110400304 A | | 11/2019 |
| CN | 110533720 A | | 12/2019 |
| WO | 2017120266 A1 | | 7/2017 |

OTHER PUBLICATIONS

Dry goods_Introduction to target detection, reading this is enough (completed)—Programmer Sought; https://zhuanlan.zhihu.com/p/34142321.

A Survey of Object Detection Algorithms Based on Deep Learning; https://zhuanlan.zhihu.com/p/33981103.

Ross Girshick et al. "Rich feature hierarchies for accurate object detection and semantic segmentation", 2014 IEEE Conference on Computer Vision and Pattern Recognition.

"Fast R-CNN", Ross Girshick Microsoft Research, 2015.

Uijlings et al. "Selective Search for Object Recognition", http://vision.stanford.edu/teaching/cs231b_spring1415/slides/ssearch_schuyler.pdf.

Shaoqing Ren et al. "Faster R-CNN: Towards Real Time Object Detection with Region Proposal Networks", 2016.

Joseph Redmon et al. "You Only Look Once: Unified, Real-Time Object Detection", 2015.

Wei Liu et al. "SSD: Single Shot Multibox Detector", 2015.

"3D point cloud segmentation: A survey". 2013 6th International Conference on Robotics, Automation and Mechatronics (RAM).

Georgakis et al., "Multiview RGB-D Dataset for Object Instance Detection", 2016 Fourth International Conference On 3DVISION (3DV), Sep. 26, 2016 (9 pages).

Ren et al., "3D Object Detection with Latent Support Surfaces", 2018 IEEE/CVF Conference on Computer Vision and Pattern Recognition, 2018 (11 pages).

International Search Report and Written Opinion, International Application No. PCT/CN2020/114034, mailed Dec. 11, 2020 (6 pages).

Extended European Search Report for European Application No. EP20898408.8, mailed Jan. 2, 2023 (8 pages).

Chinese First Office Action for Chinese Application No. CN202080084583.4, mailed Jun. 26, 2024 (17 pages).

Chinese Second Office Action for Chinese Application No. 202080084583.4, mailed Nov. 27, 2024 (14 pages).

Chinese Rejection decision for Chinese Application No. 202080084583.4, mailed Feb. 20, 2025 (15 pages).

European Examination Report for European Application No. 20898408.8, mailed Mar. 13, 2025 (5 pages).

Non-Final Office Action for U.S. Appl. No. 17/836,898, mailed Jul. 25, 2024 (6 pages).

Final Office Action for U.S. Appl. No. 17/836,898, mailed Nov. 13, 2024 (10 pages).

Non-Final Office Action for U.S. Appl. No. 17/836,898, mailed Feb. 7, 2025 (7 pages).

* cited by examiner

OBJECT DETECTION METHOD, OBJECT DETECTION DEVICE, TERMINAL DEVICE, AND MEDIUM

CROSS-REFERENCE TO RELATED APPLICATION

This application is a continuation of International Application No. PCT/CN2020/114063 filed on Sep. 8, 2020, which claims priority to and benefits of U.S. patent application Ser. No. 62/947,333, filed with the United States Patent and Trademark Office on Dec. 12, 2019, the entire contents of which are incorporated herein by reference.

TECHNICAL FIELD

The present disclosure relates to the field of image recognition technologies, and more particularly, to an object detection method, an object detection device, a terminal device, and a medium.

BACKGROUND

Objects such as faces or cars in images can be detected through object detection, which is widely used in the field of image recognition technologies.

Currently, a mainstream object detection method includes two stages. The first stage is to extract a number of regions (i.e., region proposals) that may include objects based on an image by using a region proposal generation method. The second stage is to perform feature extraction on the extracted region proposals, and then identify categories of the objects in the region proposals by a classifier.

In the related art, during object detection, methods such as selective search and deep learning, are usually adopted in the first stage to generate region proposals, which may generate unreasonable redundant region proposals. Therefore, it is easy to cause waste of computing resources and computing time due to redundant region proposals during subsequent feature extraction and the like on the region proposals.

SUMMARY

Embodiments of the present disclosure provide an object detection method, an object detection device, a terminal device, and a computer readable storage medium, for the purpose of solving the following technical problems in the related art. The object detection method in the related art may generate some unreasonable redundant region proposals, which may result in waste of computing resources and computing time during subsequent feature extraction and the like on the region proposals.

For this, embodiments of a first aspect provide an object detection method. The method includes: acquiring a scene image of a scene; acquiring a three-dimensional point cloud corresponding to the scene; segmenting the scene image according to the three-dimensional point cloud corresponding to the scene to generate a plurality of region proposals; and performing object detection on the plurality of region proposals to determine a target object to be detected in the scene image.

Embodiments of a second aspect provide an object detection device. The device includes: a first acquiring module, configured to acquire a scene image of a scene; a second acquiring module, configured to acquire a three-dimensional point cloud corresponding to the scene; a processing module, configured to segment the scene image according to the three-dimensional point cloud corresponding to the scene to generate a plurality of region proposals; and a detecting module, configured to perform object detection on the plurality of region proposals to determine a target object to be detected in the scene image.

Embodiments of a third aspect provide a terminal device, comprising: a memory, a processor, and computer programs stored in the memory and executable by the processor. When the processor executes the computer programs, the object detection method according to embodiments of the first aspect is implemented.

Embodiments of a fourth aspect provide a computer readable storage medium, storing computer programs therein. When the computer programs are executed by a processor, the object detection method according to embodiments of the first aspect is implemented.

The technical solution disclosed in the present disclosure has the following beneficial effects.

When performing object detection on the scene image, the scene image is segmented according to the three-dimensional point cloud corresponding to the scene to generate the plurality of region proposals, such that the generated region proposals are more accurate, and the number of the generated region proposals is greatly reduced. Since the number of the generated region proposals is reduced, the computing time is reduced and less computing resource is consumed for subsequent feature extraction and the like on the region proposals, thereby saving the computing time and computing resource for object detection, and improving the efficiency of object detection.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
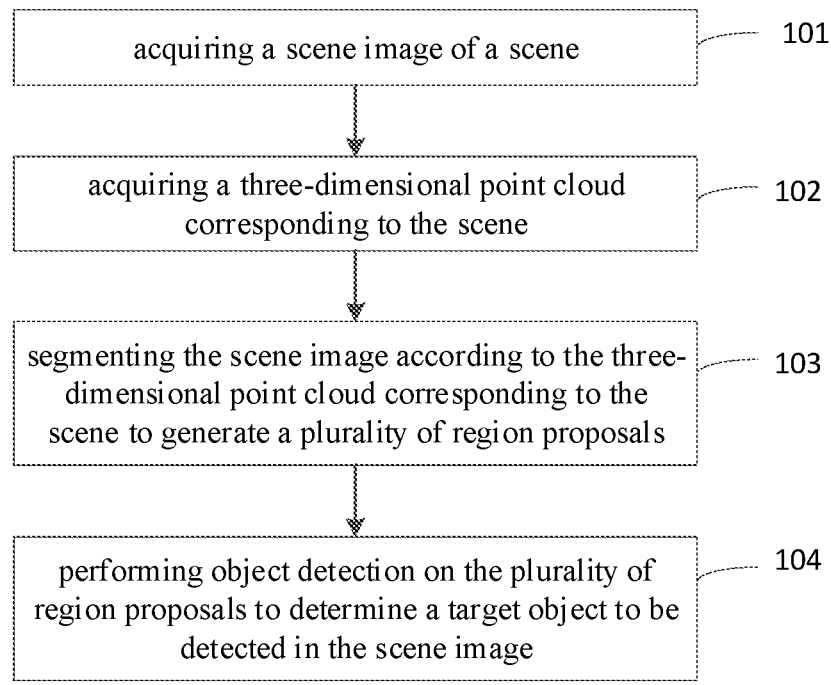
FIG. 1 is a flowchart of an object detection method according to an embodiment of the present disclosure.

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

Currently, a mainstream object detection method includes two stages. The first stage is to extract a number of regions (i.e., region proposals) that may include objects based on an image by using a region proposal generation method. The second stage is to perform feature extraction on the extracted region proposals, and then identify categories of the objects in the region proposals by a classifier.

In the related art, during object detection, methods such as selective search and deep learning, are usually adopted in the first stage to generate region proposals, which may generate unreasonable redundant region proposals. Therefore, it is easy to cause waste of computing resources and computing time due to redundant region proposals during subsequent feature extraction and the like on the region proposals.

Embodiments of the present disclosure provide an object detection method for the above technical problems. After a scene image of a scene is acquired, a three-dimensional point cloud corresponding to the scene is acquired. The scene image is segmented according to the three-dimensional point cloud corresponding to the scene to generate a plurality of region proposals. Object detection is performed on the plurality of region proposals to determine a target object to be detected in the scene image.

With the object detection method according to embodiments of the present disclosure, when performing object detection, the scene image is segmented according to the sparse three-dimensional point cloud corresponding to the scene to generate the plurality of region proposals, such that the generated region proposals are more accurate, and the number of the generated region proposals is greatly reduced. Since the number of the generated region proposals is reduced, the computing time is reduced and less computing resource is consumed for subsequent feature extraction and the like on the region proposals, thereby saving the computing time and computing resource for object detection, and improving the efficiency of object detection.

An object detection method, an object detection device, a terminal device, and a computer readable storage medium are described below with reference to the drawings.

The object detection method according to the embodiments of the present disclosure is specified below in combination with FIG. 1. FIG. 1 is a flowchart of an object detection method according to an embodiment of the present disclosure.

As illustrated in FIG. 1, the object detection method according to the present disclosure may include the following acts.

At block 101, a scene image of a scene is acquired.

In detail, the object detection method according to the present disclosure may be executed by the object detection device according to the present disclosure. The object detection device may be configured in a terminal device to perform object detection on the scene image of the scene. The terminal device according to the embodiments of the present disclosure may be any hardware device capable of data processing, such as a smart phone, a tablet computer, a robot, and a wearable device like a head mounted mobile device.

It is understood that a camera can be configured in the terminal device to take the scene image of the scene.

The scene may be a physical scene or a virtual scene, and the scene image may be static or dynamic, which are not limited herein.

At block 102, a three-dimensional point cloud corresponding to the scene is acquired.

In detail, the three-dimensional point cloud corresponding to the scene may be generated by scanning the scene using a simultaneous localization and mapping (SLAM) system, or a dense three-dimensional point cloud corresponding to the scene may be acquired by a depth camera, or the three-dimensional point cloud of the scene may be acquired by other methods, which is not limited herein.

At block 103, the scene image is segmented according to the three-dimensional point cloud corresponding to the scene to generate a plurality of region proposals.

In detail, the act at block 103 can be implemented by the following acts.

At block 103a, the three-dimensional point cloud corresponding to the scene is segmented to form a plurality of three-dimensional regions.

At block 103b, the plurality of three-dimensional regions are projected onto the scene image to form the plurality of region proposals.

The act at block 103a can be implemented in several manners.

A First Manner

It can be understood that the texture, color and other characteristics of the same object are usually identical or similar, and the texture, color and other characteristics between different objects are usually different. Correspondingly, in the three-dimensional point cloud corresponding to the scene, the similarity between the three-dimensional points corresponding to the same object is usually greater than the similarity between the three-dimensional point of the object and the three-dimensional point of another object. Then, in the embodiments of the present disclosure, when the three-dimensional point cloud corresponding to the scene is segmented to form the plurality of three-dimensional regions, according to the similarities among the three-dimensional points in the three-dimensional point cloud corresponding to the scene, the three-dimensional points having large similarity are merged together to form a plurality of three-dimensional point sub clouds, and the areas where each three-dimensional point sub cloud is located is the three-dimensional region, thereby segmenting the three-dimensional point cloud into the plurality of three-dimensional regions.

In detail, the three-dimensional points in the three-dimensional point cloud can be categorized into a plurality of categories by using a clustering algorithm, so that the similarity between the three-dimensional points of one category is greater than the similarity between the three-dimensional point of one category and the three-dimensional point of another category. Then, the three-dimensional points in each category are merged together to form a plurality of three-dimensional point sub clouds, and the area occupied by each three-dimensional point sub cloud is the three-dimensional region, thereby segmenting the three-dimensional point cloud after the merging into the plurality of three-dimensional regions.

The clustering algorithm may be a distance-based clustering algorithm, such as a k-means clustering algorithm, or a graph-based clustering algorithm, such as a graph-cut algorithm, or other arbitrary clustering algorithms, which are not limited in this disclosure.

That is, the act at block 103a can be implemented in the following manner.

The three-dimensional points in the three-dimensional point cloud are merged by the clustering algorithm and the three-dimensional point cloud after the merging is segmented to form the plurality of three-dimensional regions.

Figure 2:
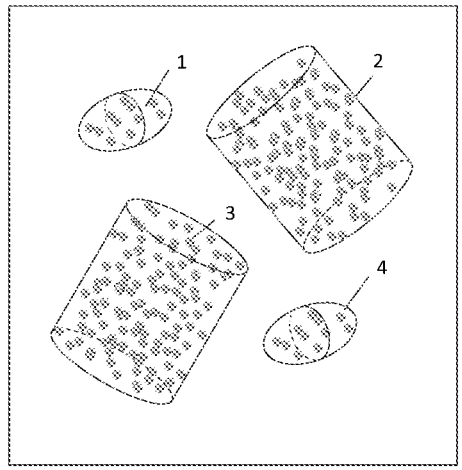
FIG. 2 is a schematic diagram of a method for generating a plurality of three-dimensional regions according to an embodiment of the present disclosure.

For example, it is supposed that the three-dimensional points illustrated in FIG. 2 is a portion of three-dimensional points in the three-dimensional point cloud corresponding to the scene. By the clustering algorithm, the three-dimensional points in a three-dimensional frame 1 in the figure are classified into one category, the three-dimensional points in a three-dimensional frame 2 in the figure are classified into one category, the three-dimensional points in a three-dimensional frame 3 in the figure are classified into one category, and the three-dimensional points in a three-dimensional frame 4 in the figure are classified into one category. The three-dimensional points in each of the three-dimensional frames 1, 2, 3, and 4 can be merged to form four three-dimensional point sub clouds, and the area occupied by each of the four three-dimensional point sub clouds is the three-dimensional region, thereby realizing the segment of the three-dimensional point cloud after the merging into four three-dimensional regions.

A Second Manner

It can be understood that an object usually has a certain shape, for example, a cup can be cylindrical, a door can be square. Correspondingly, three-dimensional points corresponding to an object with a certain shape in the scene, in the three-dimensional point cloud can also be fitted as a specific shape. In the embodiments of the present disclosure, the three-dimensional points in the three-dimensional point cloud may be fitted with a plurality of preset models to segment the three-dimensional point cloud into a plurality of three-dimensional regions corresponding to the plurality of preset models.

That is, the act at block 103a can be implemented in the following manner.

The plurality of three-dimensional points in the three-dimensional point cloud may be fitted with the plurality of preset models to segment the three-dimensional point cloud into the plurality of three-dimensional regions corresponding to the plurality of preset models.

The preset model may be a preset geometric basic model, such as a sphere, a cylinder, and a plane, or a complex geometric model composed of geometric basic models, or other preset models, which is not limited herein.

In the implementation, if the three-dimensional points in the three-dimensional point cloud can be fitted by the plurality of preset models, the three-dimensional points corresponding to each of the plurality of preset models can be merged into a three-dimensional point sub cloud, and the three-dimensional points in each three-dimensional point sub cloud corresponds to one preset model, and the area occupied by each three-dimensional point sub cloud is the three-dimensional region, so that the three-dimensional point cloud can be segmented into the plurality of three-dimensional regions corresponding to the plurality of preset models.

The manner of fitting the three-dimensional points in the three-dimensional point cloud to the preset models may be a least square method or any other manner, which is not limited herein.

For example, assuming that in the three-dimensional point cloud corresponding to the scene, three-dimensional points identified as 1-200 are portion of the three-dimensional points, the three-dimensional points identified as 1-100 can be fitted with a preset model 1, and the three-dimensional points identified as 101-200 can be fitted with a preset model 2. The three-dimensional points identified as 1-100 can be merged into a three-dimensional point sub cloud A, and the three-dimensional points identified as 101-200 can be merged into a three-dimensional point sub cloud B. An area occupied by the three-dimensional point sub cloud A is a three-dimensional region, and an area occupied by the three-dimensional point sub cloud B is also a three-dimensional region.

It should be noted that, the first manner and the second manner are only two examples of segmenting the three-dimensional point cloud corresponding to the scene to form the plurality of three-dimensional regions. In practical applications, those skilled in the art may segment the three-dimensional point cloud corresponding to the scene in any other manner, which is not limited herein.

Further, after the three-dimensional point cloud corresponding to the scene is segmented to form the plurality of three-dimensional regions, the plurality of three-dimensional regions are projected onto the scene image, and a two-dimensional bounding box corresponding to each three-dimensional region is the region proposal to be determined by this disclosure.

In detail, coordinate transformation can be used to convert each three-dimensional point coordinate of each three-dimensional region from an object coordinate system to a world coordinate system, to a camera coordinate system, to a projection coordinate system, and then to an image coordinate system sequentially. Therefore, each three-dimensional region is projected onto the scene image. After the projection, a two-dimensional bounding box corresponding to each three-dimensional region is the region proposal, thereby generating the plurality of region proposals.

Figure 3:
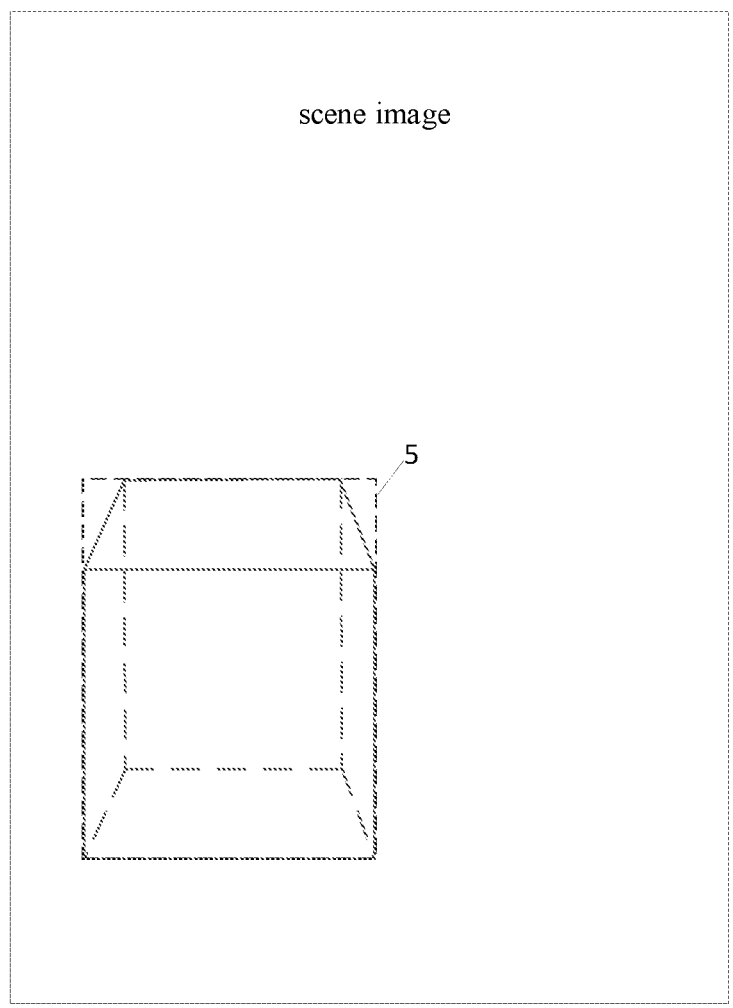
FIG. 3 is a schematic diagram of a method of generating a region proposal according to an embodiment of the present disclosure.

For example, it is supposed that the cube in FIG. 3 is a three-dimensional region formed by segmenting the three-dimensional point cloud corresponding to the scene, and then the three-dimensional region is projected onto the scene image, and the two-dimensional bounding box (a dotted line box 5 in FIG. 3) corresponding to the three-dimensional region is the region proposal.

It can be understood that, when performing object detection, the embodiments of the present disclosure segment the scene image by using the three-dimensional point cloud corresponding to the scene to form the plurality of region proposals. By combining the three-dimensional information, the generated region proposals can be more accurate, and less in number.

At block 104, object detection is performed on the plurality of region proposals to determine a target object to be detected in the scene image.

In detail, after forming the plurality of region proposals, feature maps of the plurality of region proposals may be extracted by using a neural network, and then a classification method is adopted to identify the categories of the objects in each region proposal, and then a bounding box of each object is subject to regression, so that the size of each object is determined to realize object detection on the plurality of region proposals, thereby determining the target object to be detected in the scene image.

The neural network for extracting the feature map of the region proposal may be arbitrary feature extraction network. Any image classification neural network can be used to determine the object category. When the bounding box of the object is regressed, any regression neural network can be utilized, which is not limited herein.

It is understood that the object detection method according to the embodiments of the present disclosure can be applied to an Augmented Reality (AR) software development kit (SDK) to provide an object detection function, and the developer can utilize the object detection function in the AR SDK to realize the identification of objects in the scene, and then realize various functions, such as product recommendation in the e-commerce field.

With the object detection method according to embodiments of the present disclosure, the scene image of the scene is acquired, the three-dimensional point cloud corresponding to the scene is acquired, and the scene image is segmented according to the three-dimensional point cloud corresponding to the scene to generate the plurality of region proposals, and finally, object detection is performed on the plurality of region proposals to determine the target object to be detected in the scene image. Therefore, when performing object detection on the scene image, the scene image is segmented according to the three-dimensional point cloud corresponding to the scene to generate the plurality of region proposals, such that the generated region proposals are more accurate, and the number of the generated region proposals is greatly reduced. Since the number of the generated region proposals is reduced, the computing time is reduced and less computing resource is consumed for subsequent feature extraction and the like on the region proposals, thereby saving the computing time and computing resource for object detection, and improving the efficiency of object detection.

Figure 4:
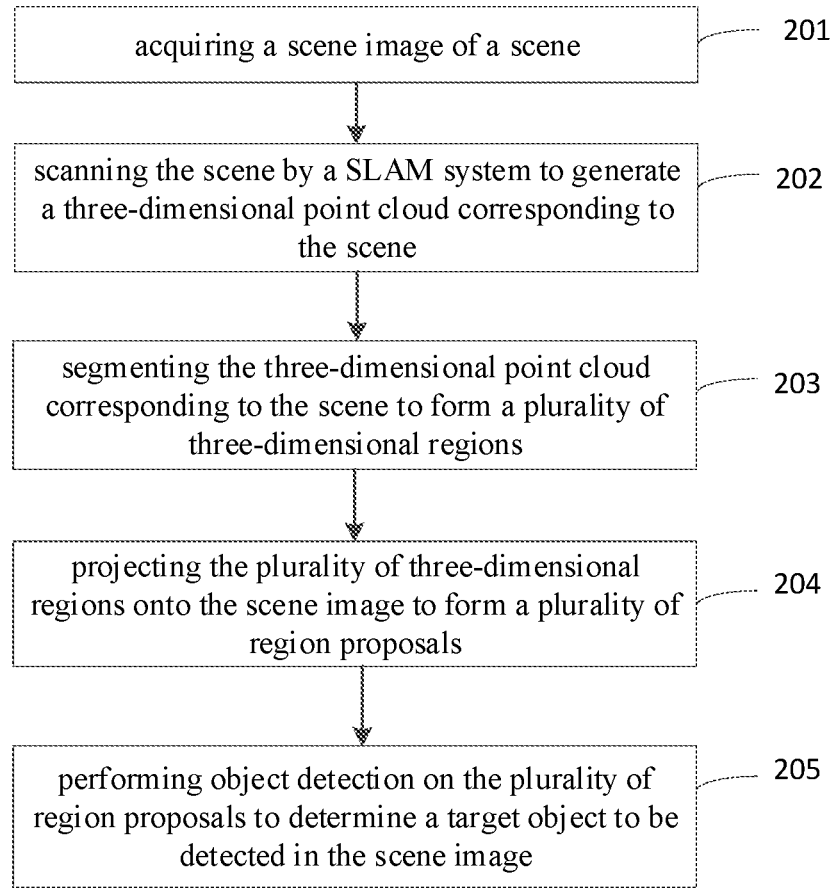
FIG. 4 is a flowchart of an object detection method according to an embodiment of the present disclosure.

The object detection method according to embodiments of the present disclosure is further described below with reference to FIG. 4. FIG. 4 is a flowchart of an object detection method according to an embodiment of the present disclosure.

As illustrated in FIG. 4, the object detection method according to embodiments of the present disclosure may include the following acts.

At block 201, a scene image of a scene is acquired.

At block 202, the scene is scanned by a simultaneous localization and mapping (SLAM) system to generate a three-dimensional point cloud corresponding to the scene.

The SLAM system utilized in the embodiments of the present disclosure will be briefly described below.

The SLAM system, as its name implies, enables both positioning and map construction. When the user holds or wears a terminal device and starts from an unknown location in an unknown environment, the SLAM system in the terminal device estimates position and posture of the camera at each moment through feature points observed by the camera during the motion, and merges image frames acquired at different moments by the camera to reconstruct into a complete three-dimensional map of the scene around the user. The SLAM system is widely used in robot positioning navigation, virtual reality (VR), augmented reality (AR), drone, and unmanned driving. The position and posture of the camera at each moment can be represented by a matrix or vector containing rotation and translation information.

The SLAM systems can be generally divided into visual front-end module and optimized back-end module.

The main tasks of the visual front-end are solving the camera pose transformation between adjacent frames by using the image frames acquired by the camera at different moments during motion and through the feature matching, and completing the fusion of the image frames to reconstruct a map.

The visual front-end relies on sensors installed in terminal devices such as robots or smart phones. Common sensors include cameras (such as monocular cameras, binocular cameras, TOF cameras), inertial measurement units (IMUs), and laser radars, and are configured to collect various types of raw data in the actual environment, including laser scanning data, video image data, and point cloud data.

The SLAM system's optimized back-end is mainly to optimize and fine-tune the inaccurate camera pose and reconstruction map obtained by the visual front-end, which can be separated from the visual front-end as an offline operation or integrated into the visual front-end.

In an implementation, the SLAM system can be used to obtain the three-dimensional point cloud corresponding to the scene by using the following manners.

In detail, the camera included in the terminal device may be calibrated in advance to determine internal parameters of the camera, and then the scene is scanned using the calibrated camera, and the three-dimensional point cloud corresponding to the scene is generated by using the SLAM system.

To calibrate the camera, it can first print a 7*9 black and white calibration board on a A4 paper, and the size of the checkerboard on the calibration board is measured as 29.1 mm. The calibration board is posted on a neat and flat wall, and a video is shot against the calibration board using the camera to be calibrated. During the shooting, the camera is continuously moved to shoot the calibration board from different angles and at different distances. The calibration program is written using OpenCV packaged algorithms and functions. Finally, the video is converted into images, and 50 of the images are selected as calibration images together with the basic parameters of the calibration board to be input into the calibration program, and then the internal parameters of the camera can be calculated.

A point in a world coordinate system is measured in terms of physical dimensions, and a point in an image plane is measured in pixels. The internal parameters are used to make a linear change between the two coordinate systems. A point Q (X, Y, Z) in a space can be transformed by the internal parameter matrix to obtain the corresponding point q (u, v) of the point projected by the ray onto the pixel coordinate system on the image plane, in which:

$$Z\begin{bmatrix}u\\v\\1\end{bmatrix}=K\begin{bmatrix}X\\Y\\Z\end{bmatrix}.$$

K is the internal parameter matrix of the camera.

$$K=\begin{bmatrix}\frac{f}{dx} & 0 & u_0\\ 0 & \frac{f}{dy} & v_0\\ 0 & 0 & 1\end{bmatrix},$$

where, f is a focal length of the camera in units of millimeters, dx and dy are a length and a width of each pixel in units of millimeters, $u_0$, $v_0$ are coordinates of a center of the image usually in units of pixels.

According to the internal parameters of the camera and the height and width of the scene image obtained when the camera is shooting the scene, a camera parameter file is written according to the format required by a DSO program, and the camera parameter file is used as an input to start the DSO program. In other words, the three-dimensional point cloud of the scene can be constructed in real time when the camera is used to scan the scene.

It should be noted that the foregoing method is only an implementation manner of scanning the scene by the SLAM system to generate the three-dimensional point cloud corresponding to the scene. In an actual application, the SLAM system may be used to generate the three-dimensional point cloud corresponding to the scene by using any other method, which is not limited therein.

In addition, in the foregoing embodiments, the SLAM system is used to scan the scene to generate the three-dimensional point cloud corresponding to the scene. In an actual application, a dense three-dimensional point cloud corresponding to the scene may be acquired by a depth camera, or the three-dimensional point cloud of the scene may be acquired by using other methods, which is not limited therein.

At block 203, the three-dimensional point cloud corresponding to the scene is segmented to form a plurality of three-dimensional regions.

In a possible implementation, the three-dimensional points in the three-dimensional point cloud can be classified into a plurality of categories by a clustering algorithm, so that the similarity between the three-dimensional points of one category is greater than the similarity between the three-dimensional point of one category and the three-dimensional point of other category. Then the three-dimensional points of one category are merged together to form a three-dimensional point sub cloud. The area occupied by each three-dimensional point sub cloud is the three-dimensional region, thereby segmenting the three-dimensional point cloud after the merging into the plurality of three-dimensional regions.

The clustering algorithm may be a distance-based clustering algorithm, such as a k-means clustering algorithm, or a graph-based clustering algorithm, such as a graph-cut algorithm, or other arbitrary clustering algorithms, which are not limited herein.

Taking the clustering algorithm as the k-means algorithm as an example, the process of merging the three-dimensional points in the three-dimensional point cloud by the clustering algorithm and segmenting the three-dimensional point cloud after the merging to form the plurality of three-dimensional regions is introduced.

In detail, the number of three-dimensional regions that need to be formed may be preset, that is, the number k of categories in which the three-dimensional points in the three-dimensional point cloud are segmented by the k-Means algorithm. The number N of three-dimensional points in the three-dimensional point cloud is counted, and k three-dimensional cluster center points are generated randomly. It is determined that each of the N three-dimensional points belongs to which cluster center point of the k three-dimensional cluster center points, that is, the category of each three-dimensional point is determined, and then all the three-dimensional points of the category of each cluster center point is determined. For each cluster center point, a coordinate of a center point of all three-dimensional points belonging to the cluster center point is determined, and a coordinate of the cluster center point is modified as the coordinate of the center point. Then, according to the above manner, which cluster center point of the k cluster center points each three-dimensional point belongs to is determined, and then the coordinate of each cluster center point is determined according to the coordinate of the center point of all the three-dimensional points belonging to each cluster center point, the process is repeated until the algorithm converges. In this case, all three-dimensional points can be classified into k categories, and then the three-dimensional points of each category are merged together to form k three-dimensional point sub clouds, and the area occupied by each three-dimensional point cloud is the three-dimensional region, thereby segmenting the three-dimensional point cloud after merging to form k three-dimensional regions.

When determining which of the k three-dimensional cluster center points a certain three-dimensional point belongs to, the distance between the three-dimensional point and the k cluster center points may be separately calculated, and the cluster center point with the shortest distance to the three-dimensional point is regarded as the cluster center point of the three-dimensional point.

In another possible implementation, the three-dimensional points in the three-dimensional point cloud can also be fitted with a plurality of preset models to segment the three-dimensional point cloud into a plurality of three-dimensional regions corresponding to the plurality of preset models.

The preset model may be a preset geometric basic model, such as a sphere, a cylinder, and a plane, or a complex geometric model composed of geometric basic models, or other preset models, which is not limited herein.

In the implementation, if the three-dimensional points in the three-dimensional point cloud can be fitted by the plurality of preset models, the three-dimensional points corresponding to each of the plurality of preset models can be merged into a three-dimensional point sub cloud, and the three-dimensional points in each three-dimensional point sub cloud corresponds to one preset model, and the area occupied by each three-dimensional point sub cloud is the three-dimensional region, so that the three-dimensional point cloud can be segmented into the plurality of three-dimensional regions corresponding to the plurality of preset models.

The manner of fitting the three-dimensional points in the three-dimensional point cloud to the preset model may be a least square method or any other manner, which is not limited herein.

Taking the cylinder as one of the plurality of preset models as an example, when fitting the three-dimensional points in the three-dimensional point cloud with the cylinder, the cylinder is parameterized, for example, the cylinder in a space can be represented by parameters such as a center coordinate (X, Y, Z), a bottom radius, a height, and an orientation in three-dimensional space, and then several three-dimensional points are randomly selected from the three-dimensional point cloud by using RANdom SAmple Consensus (RANSAC) algorithm each time. Assuming that these three-dimensional points are in the cylinder, the parameters of the cylinder is calculated, and then the number of three-dimensional points in the three-dimensional point cloud, which are on the cylinder, is counted, and whether the number exceeds a preset number threshold is determined. If not exceeded, another several three-dimensional points are randomly selected to repeat the process, otherwise, it can be determined that the three-dimensional points on the cylinder in the three-dimensional point cloud can be fitted with the cylinder, then the algorithm continues to determine whether the three-dimensional points in the three-dimensional point cloud are fitted with other preset models, thereby combining the three-dimensional points fitted with each of the plurality of preset models to form the plurality of three-dimensional point sub clouds. Three-dimensional points in each three-dimensional point sub cloud corresponds to one preset model, and the area occupied by each three-dimensional point sub cloud is the three-dimensional region, so that the three-dimensional point cloud can be segmented into the plurality of three-dimensional regions corresponding to the plurality of preset models.

The number threshold can be set as needed, which is not limited herein.

In addition, a distance threshold can be set and the distance of all three-dimensional points in the three-dimensional point cloud to the cylinder can be calculated, thereby determining a three-dimensional point whose distance is less than the distance threshold as a three-dimensional point on the cylinder.

It should be noted that the above first manner and the second manner are only two examples of segmenting the three-dimensional point cloud corresponding to the scene to form the plurality of three-dimensional regions. In practical application, those skilled in the art can segment the three-dimensional point cloud corresponding to the scene in any other way, which is not limited herein.

At block 204, the plurality of three-dimensional regions are projected onto the scene image to form a plurality of region proposals.

At block 205, object detection is performed on the plurality of region proposals to determine a target object to be detected in the scene image.

Further, after the three-dimensional point cloud corresponding to the scene is segmented to form the plurality of three-dimensional regions, the plurality of three-dimensional regions are projected onto the scene image, and the obtained two-dimensional bounding boxes corresponding to the three-dimensional regions are the plurality of region proposals to be determined in this disclosure.

In detail, after forming the plurality of region proposals, feature maps of the plurality of region proposals may be extracted by using a neural network, and then a classification method is used to identify the categories of the objects in each region proposal, and then a bounding box of each object is regressed. The size of each object is determined to achieve object detection on the plurality of region proposals, thereby determining the target object to be detected in the scene image.

The neural network for extracting the feature map of the region proposal may be arbitrary feature extraction network. Any image classification neural network can be used to determine the object category. When the bounding box of the object is regressed, any regression neural network can be utilized, which is not limited herein.

It should be noted that the description of the object detection method in the foregoing embodiments is also applicable to this embodiment, and details are not described herein again.

With the object detection method according to embodiments of the present disclosure, after acquiring the scene image of the scene, the SLAM system is adopted to scan the scene to generate the three-dimensional point cloud corresponding to the scene, and then the corresponding three-dimensional point cloud is segmented to form the plurality of three-dimensional regions, which are projected onto the scene image to form the plurality of region proposals, and finally object detection is performed on the plurality of region proposals to determine the target object to be detected in the scene image. When performing object detection on the scene image, the scene image is segmented according to the three-dimensional point cloud corresponding to the scene to generate the plurality of region proposals, such that the generated region proposals are more accurate, and the number of the generated region proposals is greatly reduced. Since the number of the generated region proposals is reduced, the computing time is reduced and less computing resource is consumed for subsequent feature extraction and the like on the region proposals, thereby saving the computing time and computing resource for object detection, and improving the efficiency of object detection.

Figure 5:
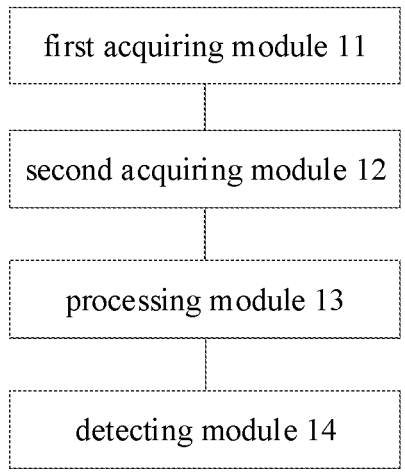
FIG. 5 is a block diagram of an object detection device according to an embodiment of the present disclosure.

The object detection device according to embodiments of the present disclosure is described below in combination with FIG. 5. FIG. 5 is a block diagram of an object detection device according to an embodiment of the present disclosure.

As illustrated in FIG. 5, the object detection device includes a first acquiring module 11, a second acquiring module 12, a processing module 13, and a detecting module 14.

The first acquiring module 11 is configured to acquire a scene image of a scene.

The second acquiring module 12 is configured to acquire a three-dimensional point cloud corresponding to the scene.

The processing module 13 is configured to segment the scene image according to the three-dimensional point cloud corresponding to the scene to generate a plurality of region proposals.

The detecting module 14 is configured to perform object detection on the plurality of region proposals to determine a target object to be detected in the scene image.

In detail, the object detection device can perform the object detection method described in the foregoing embodiments. The device may be configured in the terminal device to perform object detection on the scene image of the scene. The terminal device in the embodiments of the present disclosure may be any hardware device capable of data processing, such as a smart phone, a tablet computer, a robot, a wearable device such as a head mounted mobile device.

In an exemplary embodiment, the second acquiring module 12 is configured to scan the scene by a simultaneous localization and mapping (SLAM) system to generate the three-dimensional point cloud corresponding to the scene.

It should be noted that the implementation process and technical principle of the object detection device in this embodiment refer to the foregoing illustration of the object detection method in the embodiments of the first aspect, and details are not described herein again.

With the object detection device according to embodiments of the present disclosure, the scene image of the scene is acquired, the three-dimensional point cloud corresponding to the scene is acquired, and the scene image is segmented according to the three-dimensional point cloud corresponding to the scene to generate the plurality of region proposals, and finally, object detection is performed on the plurality of region proposals to determine the target object to be detected in the scene image. Therefore, when performing object detection on the scene image, the scene image is segmented according to the three-dimensional point cloud corresponding to the scene to generate the plurality of region proposals, such that the generated region proposals are more accurate, and the number of the generated region proposals is greatly reduced. Since the number of the generated region proposals is reduced, the computing time is reduced and less computing resource is consumed for subsequent feature extraction and the like on the region proposals, thereby saving the computing time and computing resource for object detection, and improving the efficiency of object detection.

Figure 6:
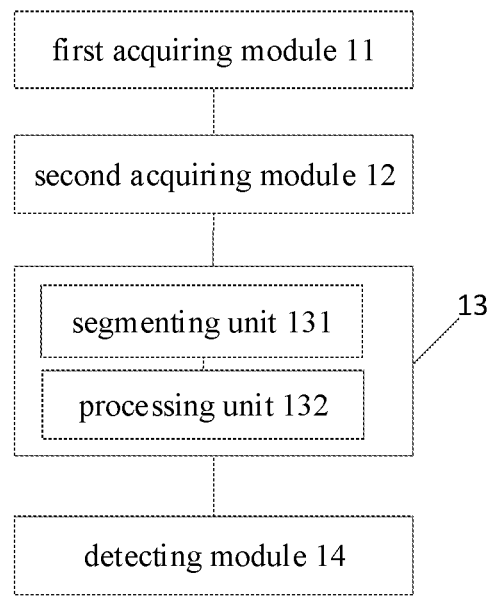
FIG. 6 is a block diagram of an object detection device according to an embodiment of the present disclosure.

The object detection device according to embodiments of the present disclosure is further described below in combination with FIG. 6. FIG. 6 is a block diagram of an object detection device according to an embodiment of the present disclosure.

As illustrated in FIG. 6, on the basis of FIG. 5, the processing module 13 comprises: a segmenting unit 131 and a processing unit 132.

The segmenting unit 131 is configured to segment the three-dimensional point cloud corresponding to the scene to form a plurality of three-dimensional regions.

The processing unit 132 is configured to project the plurality of three-dimensional regions onto the scene image to form the plurality of region proposals.

In an exemplary embodiment, the segmenting unit 131 is configured to: merge a plurality of three-dimensional points in the three-dimensional point cloud by a clustering algorithm; and segment the three-dimensional point cloud after merging to form the plurality of three-dimensional regions.

The clustering algorithm includes a distance-based clustering algorithm or a graph-based clustering algorithm.

In an exemplary embodiment, the segmenting unit 131 is configured to fit a plurality of three-dimensional points in the three-dimensional point cloud with a plurality of preset models to segment the three-dimensional point cloud into a plurality of three-dimensional regions corresponding to the plurality of preset models.

It should be noted that the implementation process and technical principle of the object detection device in this embodiment refer to the foregoing illustration of the object detection method in the embodiments of the first aspect, and details are not described herein again.

With the object detection device according to embodiments of the present disclosure, the scene image of the scene is acquired, the three-dimensional point cloud corresponding to the scene is acquired, and the scene image is segmented according to the three-dimensional point cloud corresponding to the scene to generate the plurality of region proposals, and finally, object detection is performed on the plurality of region proposals to determine the target object to be detected in the scene image. Therefore, when performing object detection on the scene image, the scene image is segmented according to the three-dimensional point cloud corresponding to the scene to generate the plurality of region proposals, such that the generated region proposals are more accurate, and the number of the generated region proposals is greatly reduced. Since the number of the generated region proposals is reduced, the computing time is reduced and less computing resource is consumed for subsequent feature extraction and the like on the region proposals, thereby saving the computing time and computing resource for object detection, and improving the efficiency of object detection.

In order to realize the above embodiment, the present disclosure further provides a terminal device.

Figure 7:
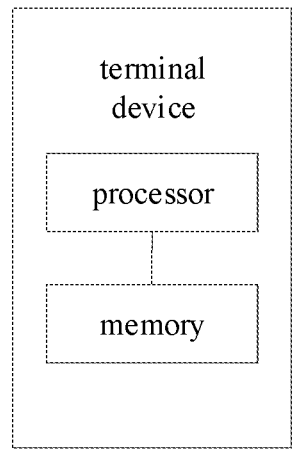
FIG. 7 is a block diagram of a terminal device according to an embodiment of the present disclosure.

FIG. 7 is a block diagram of a terminal device according to an embodiment of the present disclosure.

As illustrated in FIG. 7, the terminal device, includes: a memory, a processor, and computer programs stored in the memory and executable by the processor. When the processor executes the computer programs, the object detection method according to embodiments of the first aspect is implemented.

It should be noted that the implementation process and technical principle of the terminal device in this embodiment refer to the foregoing illustration of the object detection method in the embodiments of the first aspect, and details are not described herein again.

With the terminal device according to embodiments of the present disclosure, the scene image of the scene is acquired, the three-dimensional point cloud corresponding to the scene is acquired, and the scene image is segmented according to the three-dimensional point cloud corresponding to the scene to generate the plurality of region proposals, and finally, object detection is performed on the plurality of region proposals to determine the target object to be detected in the scene image. Therefore, when performing object detection on the scene image, the scene image is segmented according to the three-dimensional point cloud corresponding to the scene to generate the plurality of region proposals, such that the generated region proposals are more accurate, and the number of the generated region proposals is greatly reduced. Since the number of the generated region proposals is reduced, the computing time is reduced and less computing resource is consumed for subsequent feature extraction and the like on the region proposals, thereby saving the computing time and computing resource for object detection, and improving the efficiency of object detection.

In order to realize the above embodiment, the present disclosure further provides a computer readable storage medium, storing computer programs therein. When the computer programs are executed by a processor, the object detection method according to embodiments of the first aspect is implemented.

In order to realize the above embodiment, the present disclosure further provides computer programs. When the computer programs are executed by a processor, the object detection method according to embodiments is implemented.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure.

In addition, terms such as "first" and "second" are used herein for purposes of description and are not intended to indicate or imply relative importance or significance. Thus, the feature defined with "first" and "second" may comprise one or more this feature.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. An object detection method, comprising:
    acquiring a scene image of a scene;
    acquiring a three-dimensional point cloud corresponding to the scene;
    segmenting the scene image according to the three-dimensional point cloud corresponding to the scene to generate a plurality of region proposals; and
    performing object detection on the plurality of region proposals to determine a target object to be detected in the scene image;
    wherein segmenting the scene image according to the three-dimensional point cloud corresponding to the scene to generate the plurality of region proposals, comprises:
        segmenting the three-dimensional point cloud corresponding to the scene to form a plurality of three-dimensional regions; and
        projecting the plurality of three-dimensional regions onto the scene image to form the plurality of region proposals.

2. The method of claim 1, wherein acquiring the three-dimensional point cloud corresponding to the scene, comprises:
    scanning the scene by a simultaneous localization and mapping (SLAM) system to generate the three-dimensional point cloud corresponding to the scene.

3. The method of claim 1, wherein segmenting the three-dimensional point cloud corresponding to the scene to form the plurality of three-dimensional regions, comprises:
    merging a plurality of three-dimensional points in the three-dimensional point cloud by a clustering algorithm; and
    segmenting the three-dimensional point cloud after merging to form the plurality of three-dimensional regions.

4. The method of claim 3, wherein the clustering algorithm comprises a distance-based clustering algorithm or a graph-based clustering algorithm.

5. The method of claim 1, wherein segmenting the three-dimensional point cloud corresponding to the scene to form the plurality of three-dimensional regions, comprises:
    fitting a plurality of three-dimensional points in the three-dimensional point cloud with a plurality of preset models to segment the three-dimensional point cloud into a plurality of three-dimensional regions corresponding to the plurality of preset models.

6. The method of claim 5, wherein the plurality of preset models comprises at least one or more of geometric basic models and/or a complex geometric model composed of geometric basic models.

7. A terminal device, comprising: a memory, a processor, and computer programs stored in the memory and executable by the processor, wherein when the processor executes the computer programs, an object detection method is implemented, the object detection method comprising:
    acquiring a scene image of a scene;
    acquiring a three-dimensional point cloud corresponding to the scene;
    segmenting the scene image according to the three-dimensional point cloud corresponding to the scene to generate a plurality of region proposals; and
    performing object detection on the plurality of region proposals to determine a target object to be detected in the scene image;
    wherein segmenting the scene image according to the three-dimensional point cloud corresponding to the scene to generate the plurality of region proposals, comprises:
        segmenting the three-dimensional point cloud corresponding to the scene to form a plurality of three-dimensional regions; and
        projecting the plurality of three-dimensional regions onto the scene image to form the plurality of region proposals.

8. The terminal device of claim 7, wherein acquiring the three-dimensional point cloud corresponding to the scene, comprises:
    scanning the scene by a simultaneous localization and mapping (SLAM) system to generate the three-dimensional point cloud corresponding to the scene.

9. The terminal device of claim 7, wherein segmenting the three-dimensional point cloud corresponding to the scene to form the plurality of three-dimensional regions, comprises:
    merging a plurality of three-dimensional points in the three-dimensional point cloud by a clustering algorithm; and
    segmenting the three-dimensional point cloud after merging to form the plurality of three-dimensional regions.

10. The terminal device of claim 9, wherein the clustering algorithm comprises a distance-based clustering algorithm or a graph-based clustering algorithm.

11. The terminal device of claim 7, wherein segmenting the three-dimensional point cloud corresponding to the scene to form the plurality of three-dimensional regions, comprises:
    fitting a plurality of three-dimensional points in the three-dimensional point cloud with a plurality of preset models to segment the three-dimensional point cloud into a plurality of three-dimensional regions corresponding to the plurality of preset models.

12. The terminal device of claim 11, wherein the plurality of preset models comprises at least one or more of geometric basic models and/or a complex geometric model composed of geometric basic models.

13. A non-transitory computer readable storage medium, storing computer programs therein, wherein when the computer programs are executed by a processor, an object detection method is implemented, the object detection method comprising:
    acquiring a scene image of a scene;
    acquiring a three-dimensional point cloud corresponding to the scene;
    segmenting the scene image according to the three-dimensional point cloud corresponding to the scene to generate a plurality of region proposals; and
    performing object detection on the plurality of region proposals to determine a target object to be detected in the scene image;
    wherein segmenting the scene image according to the three-dimensional point cloud corresponding to the scene to generate the plurality of region proposals, comprises:
        segmenting the three-dimensional point cloud corresponding to the scene to form a plurality of three-dimensional regions; and
        projecting the plurality of three-dimensional regions onto the scene image to form the plurality of region proposals.

14. The non-transitory computer readable storage medium of claim 13, wherein acquiring the three-dimensional point cloud corresponding to the scene, comprises:
scanning the scene by a simultaneous localization and mapping (SLAM) system to generate the three-dimensional point cloud corresponding to the scene.

15. The non-transitory computer readable storage medium of claim 13, wherein segmenting the three-dimensional point cloud corresponding to the scene to form the plurality of three-dimensional regions, comprises:
merging a plurality of three-dimensional points in the three-dimensional point cloud by a clustering algorithm; and
segmenting the three-dimensional point cloud after merging to form the plurality of three-dimensional regions.

16. The non-transitory computer readable storage medium of claim 15, wherein the clustering algorithm comprises a distance-based clustering algorithm or a graph-based clustering algorithm.

17. The non-transitory computer readable storage medium of claim 13, wherein segmenting the three-dimensional point cloud corresponding to the scene to form the plurality of three-dimensional regions, comprises:
fitting a plurality of three-dimensional points in the three-dimensional point cloud with a plurality of preset models to segment the three-dimensional point cloud into a plurality of three-dimensional regions corresponding to the plurality of preset models.

18. The method according to claim 1, wherein three-dimensional points of the three-dimensional point cloud are segmented into a plurality of categories, similarity between a portion of the three-dimensional points in one category of the plurality of categories is greater than similarity between the portion of the three-dimensional points of the one category and another portion of the three-dimensional points in another category of the plurality of categories; and
three-dimensional points in each of the plurality of categories form a respective one of the plurality of region proposals.

* * * * *